United States Patent
Park (10) Patent No.: US 9,088,042 B2
(45) Date of Patent: Jul. 21, 2015

(54) BATTERY PACK HAVING ELONGATE CURVED LEAD PLATES

(75) Inventor: Kyungho Park, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 526 days.

(21) Appl. No.: 12/783,513

(22) Filed: May 19, 2010

(65) Prior Publication Data

US 2011/0008651 A1    Jan. 13, 2011

Related U.S. Application Data (60) Provisional application No. 61/223,862, filed on Jul. 8, 2009.

(51) Int. Cl.
| | |
|---|---|
| *H01M 2/22* | (2006.01) |
| *H01M 2/34* | (2006.01) |
| *H01M 2/24* | (2006.01) |
| *H01M 2/20* | (2006.01) |
| *H01M 10/42* | (2006.01) |

(52) U.S. Cl.
CPC ............. *H01M 2/34* (2013.01); *H01M 2/204* (2013.01); *H01M 2/22* (2013.01); *H01M 2/24* (2013.01); *H01M 10/425* (2013.01); *H01M 2200/00* (2013.01)

(58) Field of Classification Search
CPC .......... H01M 2/22; H01M 2/24; H01M 2/204
USPC .................. 429/121, 163, 179, 161
See application file for complete search history.

(56) References Cited

U.S. PATENT DOCUMENTS

| | | | |
|---|---|---|---|
| 2003/0211385 A1 | 11/2003 | Yamazaki | |
| 2005/0287431 A1 | 12/2005 | Cho | |
| 2008/0061735 A1 | 3/2008 | Toya et al. | |
| 2008/0096101 A1* | 4/2008 | Kwag et al. | 429/121 |
| 2009/0087692 A1 | 4/2009 | Park et al. | |
| 2009/0087734 A1 | 4/2009 | Akatsuchi | |
| 2009/0104513 A1 | 4/2009 | Um | |
| 2009/0111018 A1* | 4/2009 | Park et al. | 429/179 |

(Continued)

FOREIGN PATENT DOCUMENTS

| | | |
|---|---|---|
| CN | 101170164 | 4/2008 |
| CN | 101425601 | 5/2009 |

(Continued)

OTHER PUBLICATIONS

Korean Office Action dated Aug. 27, 2011 in Application No. 2011-048301734.

(Continued)

*Primary Examiner* — Zachary Best
(74) *Attorney, Agent, or Firm* — Knobbe Martens Olson & Bear LLP (57) ABSTRACT

A battery pack is disclosed. An embodiment of the battery pack includes a bare cell comprising a first surface, a positive electrode and a negative electrode; a circuit module disposed over the first surface and comprising a positive electrode terminal and a negative electrode terminal; a first lead plate disposed over the first surface and coupled to the positive electrode and the positive electrode terminal; and a second lead plate disposed over the first surface and coupled to the negative electrode and the negative electrode terminal; wherein the first surface of the bare cell is curved, and each lead plate has a curvature conforming to the first surface.

11 Claims, 6 Drawing Sheets

(56) References Cited

U.S. PATENT DOCUMENTS

2009/0280401 A1    11/2009    Kim
2012/0105000 A1    5/2012    Toya et al.

FOREIGN PATENT DOCUMENTS

| | | | |
|---|---|---|---|
| JP | 2002-100331 | 4/2002 | |
| JP | 2002100331 A * | 4/2002 | ............. H01M 2/10 |
| JP | 2006-164579 | 6/2006 | |
| JP | 2008-066140 | 3/2008 | |
| JP | 2009-087937 | 4/2009 | |
| JP | 2009-272294 | 11/2009 | |
| KR | 10-2007-0067783 | 6/2007 | |
| KR | 10-770106 | 10/2007 | |
| KR | 10-2008-0036739 | 4/2008 | |

OTHER PUBLICATIONS

European Search Report dated Sep. 16, 2010 in European Application No. 10251225.8.
Office Action dated Aug. 21, 2012 for corresponding JP Application No. 2010-149874.
Office Action dated Aug. 24, 2012 for corresponding Cn Application No. 20100224962.7.

* cited by examiner

BATTERY PACK HAVING ELONGATE CURVED LEAD PLATES

CROSS-REFERENCE TO RELATED APPLICATIONS

This application claims priority to and the benefit of U.S. Provisional Application No. 61/223,862, filed on Jul. 8, 2009, the entire content of which is incorporated herein by reference.

BACKGROUND

1. Field

Embodiments relate to a battery pack of a chargeable and dischargeable secondary battery.

2. Description of the Related Technology

In general, a battery pack of a chargeable and dischargeable secondary battery typically includes a bare cell having a case in which an electrode assembly is accommodated, and a protective circuit module (PCM) connecting the bare cell to an external terminal to control charge and discharge of the bare cell.

In the battery pack, a lamination-type electrode assembly, obtained by laminating a positive electrode plate, a negative electrode plate, and a separator interposed between the positive electrode plate and the negative electrode plate, is typically used as the electrode assembly of the bare cell. Otherwise, a wind-type electrode assembly is used as the electrode assembly of the bare cell, in which the electrode assembly is wound in a state such that the positive electrode plate, the negative electrode plate, and the separator interposed between the positive electrode plate and the negative electrode plate are laminated. The electrode assembly is typically accommodated in a cylindrical or polygonal can or a pouch type armoring material to form the bare cell. The bare cell is typically electrically connected to the PCM.

In existing battery packs, a supporting member is typically installed to electrically connect the bare cell to the PCM and to mechanically support the PCM installed in the bare cell. A supporting holder is installed as the supporting member. Molding resin is injected and filled in a gap formed between the bare cell and the protective circuit module in a hot melting to form the supporting member. The protective circuit module is supported by the molding resin.

When the supporting holder is used as the supporting member, fabrication cost increases because a separate structure is used.

When molding resin is injected in the hot melting as the supporting member, because of inferior formation of the molding resin, the protective circuit module can become inclined in the vertical direction or be twisted laterally. When the protective circuit module is vertically inclined, the external terminal of the protective circuit module is not properly connected to an external device. When the protective circuit module is twisted laterally, the external terminal of the protective circuit module deviates from an initial position so that assembly cannot be completed.

SUMMARY

An embodiment of the present invention includes a battery pack.

In accordance with an aspect of the present invention, a battery pack comprises a bare cell that comprises a first surface, a positive electrode and a negative electrode; a circuit module disposed over the first surface and comprising a positive electrode terminal and a negative electrode terminal; a first lead plate disposed over the first surface and coupled to the positive electrode and the positive electrode terminal; and a second lead plate disposed over the first surface and coupled to the negative electrode and the negative electrode terminal; wherein the first surface of the bare cell is curved, and each lead plate has a curvature conforming to the first surface.

In accordance with another aspect of the present invention, a battery pack comprises a bare cell comprising a first surface that has a curvature and a second and third surfaces that are coupled to the first surface; a circuit module disposed over the first surface of the bare cell; a first and second lead plate disposed over the first surface and coupled to the bare cell and the circuit module wherein at least a portion of the first and second lead plates adjacent the first surface are curved with substantially the same curvature as the first surface.

BRIEF DESCRIPTION OF THE DRAWINGS

The objects, features and advantages of the present invention will be more apparent from the following detailed description in conjunction with the accompanying drawings, in which.

DETAILED DESCRIPTION

As illustrated in FIGS. 1 to 7, a battery pack 100 according to an embodiment of the present invention can include a bare cell 110, a protective circuit module 120 electrically connected to the bare cell 110 to control the charge and discharge of the bare cell 110, a first lead plate 130 and a second lead plate 140 supporting the protective circuit module 120 and electrically connecting the bare cell 110 to the protective circuit module 120, and a cover 150 surrounding the bare cell 110 and the protective circuit module 120.

The surfaces of the first and second lead plates 130 and 140, which are seated on the bare cell 110, may have the same shape as those of the surfaces that contact the bare cell 110.

The battery pack 100 according to the embodiment of the present invention can further include an insulation member 160 disposed between the first lead plate 130 and the second lead plate 140 to insulate the same from each other, and can also include a label 170 fixing the bare cell 110 and the cover 150.

The bare cell 110 may be obtained by accommodating an electrode assembly (not shown) in a can 111 made of a metal. The can 111 may be made of aluminum or an alloy of aluminum, but is not limited thereto.

The can 111 may be a polygonal can having an approximately rectangular parallelepiped.

The can 111 may include first and second rectangular surfaces 111a and 111b that are wide rectangular surfaces. Third, fourth, fifth, and sixth surfaces 111c, 111d, 111e, and 111f integrated with the first and second surfaces 111a and 111b may be narrow rectangular surfaces. The third and fourth surfaces 111c and 111d may be short in length. The fifth and sixth surfaces 111e and 111f may be longer than the third and fourth surfaces 111c and 111d.

The electrode assembly can include a positive electrode plate (not shown), a negative electrode plate (not shown), and a separator (not shown) interposed between the positive electrode plate and the negative electrode plate, which is the structure of a common electrode assembly. The positive electrode plate may be electrically connected to the can 111, and the negative electrode plate may be electrically connected to an electrode terminal 112 that protrudes outside through the third surface 111c of the bare cell 110.

The protective circuit module 120 can include a protective circuit board 121 and external terminals 122 mounted on one surface of the protective circuit board 121. The protective circuit board 121 can include a protective circuit element 123 provided on the other surface to control the charge and discharge of the bare cell 110. The protective circuit element 123 may make the charge state of the bare cell 110 uniform and prevent overcharge and overdischarge. The protective circuit board 121 can include a positive electrode connection terminal (not shown) and a negative electrode connection terminal (not shown) that are electrically connected to the positive electrode terminal and the negative electrode terminal of the bare cell 110, respectively.

The first lead plate 130 electrically may connect the positive electrode terminal of the bare cell 110 to the positive electrode connection terminal of the protective circuit board 121. The second lead plate 140 may electrically connect the negative electrode terminal of the bare cell 110 to the negative electrode connection terminal of the protective circuit board 121.

The first and second lead plates 130 and 140 may be made of any electric conductive material. The first and second lead plates 130 and 140 may be made of nickel or a nickel alloy. However, embodiments of the present invention are not limited to the above.

The shape and structure of the first and second lead plates 130 and 140 are as follows.

The first lead plate 130 can include a board connection unit 131 formed on an end and connected to the positive electrode connection terminal of the protective circuit board 121, a bare cell connection unit 132 formed on the other end and connected to the fourth surface 111d of the can 111 that corresponds to the positive electrode terminal of the bare cell 110, and a connection unit 133 connecting the board connection unit 131 to the bare cell connection unit 132.

The board connection unit 131 may be parallel with the protective circuit board 121 and may be electrically connected to the positive electrode connection terminal of the protective circuit board 121 by welding or the like.

The bare cell connection unit 132 may have a shape matching the shape of the fifth surface 111e of the bare cell 110 including the can 111. The fifth surface 111e of the can 111 may have a rounded shape with a curvature. Therefore, the bare cell connection unit 132 can include a curvature piece 134 having the same or similar curvature as that of the curvature of the fifth surface 111e and a connector 135 bent from the curvature piece 134 at a right angle to be connected to the fourth surface 111d of the can 111. The curvature piece 134 may have a larger width than that of the connector 135 so that the area that supports the protective circuit board 121 increases. The connector 135 may be connected to the fourth surface 111d of the can 111 through a first through hole 161 of the insulation member 160.

The connection unit 133 may be provided at the end of the board connection unit 131 and arranged perpendicular to one end of the curvature piece 134 that is one side of the bare cell connection unit 132 in order to connect the board connection unit 131 to the bare cell connection unit 132.

A secondary protective element may be provided between the first lead plate 130 and the protective circuit module 120. A positive temperature coefficient (PTC) element 180 or a safety element having equivalent performance may be provided as the secondary protective element. According to an embodiment of the present invention, the PTC element 180 is used as the secondary protective element. However, a thermal fuse may be used as the secondary protective element. Although the secondary protective element is not provided, the battery pack according to an embodiment of the present invention may be carried out.

The second lead plate 140 may include a board connection unit 141 provided at one end and connected to the negative electrode connection terminal of the protective circuit board 121, a bare cell connection unit 142 provided at the other end and connected to the electrode terminal 112 of the third surface 111c of the can 111 corresponding to the negative electrode terminal of the bare cell 110, and a connection unit 143 connecting the board connection unit 141 to the bare cell connection unit 142.

The board connection unit 141 may be parallel with the protective circuit board 121 and may be electrically connected to the negative electrode connection terminal of the protective circuit board 121 by welding or the like.

The bare cell connection unit 142 may have a shape matching the shape of the fifth surface 111e of the bare cell 110 including the can 111. The bare cell connection unit 142 can include a curvature piece 144 having the same or similar curvature as that of the fifth surface 111e of the can 111 and a connector 145 bent from the curvature piece 144 at a right angle to be connected to the electrode terminal 112 that protrudes from the third surface 111c of the can 111. The curvature piece 144 may have a larger width than the connection unit 145. That is, the curvature piece 144 may have a large contact area with the fifth surface 111e. Therefore, the area, of which the curvature piece 144 supports the protective circuit board 121, may increase. The connector 145 may be connected to the electrode terminal 112 of the third surface 111c of the can 111 through a second through hole 162 of the insulation member 160. That is, although the width of the connector 145 may be smaller than the width of the curvature piece 144, any width, with which the connector 145 is electrically connected to the electrode terminal 112 of the third surface 111c by welding or the like, may be allowable.

Both ends of the connection unit 143 may be perpendicular to the board connection unit 141 and the bare cell connection unit 142.

The cover 150 may surround the bare cell 110, the protective circuit module 120, and the first and second lead plates 130 and 140. The cover 150 can include four frames 151, 152, 153, and 154 integrated with each other.

The first frame 151 can correspond to the fifth surface 111e of the bare cell 110. The first frame 151 may surround the protective circuit module 120. The first frame 151 can have a plurality of terminal holes 151a, through which the external terminals 122 of the protective circuit module 120 protrude. The first frame 151 may have a water-sensitive label attaching groove 151b, to which a water-sensitive label 190 may be attached on the other side thereof.

The second frame 152 may be formed at one end of the first frame 151 to be integrated with the first frame 151. The third frame 153 may be formed at the other end of the first frame 151 to be integrated with the first frame 151. The second frame 152 may correspond to the third surface 111c of the can 111 and the third frame 153 may correspond to the fourth surface 111d of the can 111 so that the third and fourth surfaces 111c and 111d of the can 111 are protected.

Both ends of the fourth frame 154 may be integrated with the ends of the second frame 152 and the third frame 153. Therefore, the fourth frame 154 may correspond to the fourth surface 111d of the can 111 to protect the fourth surface 111d of the can 111.

The insulation member 160 may be attached to the third surface 111c, the fourth surface 111d, and the fifth surface 111e of the can 111. The insulation member 160 may insulate the protective circuit element 123 of the protective circuit module 120 mounted on the fourth surface 111d from the can 111 of the bare cell 110. The insulation member 160 may insulate the first lead plate 130 mounted on the fourth surface 111d and the second lead plate 140 mounted on the third surface 111c from the can 111 of the bare cell 110.

The insulation member 160 may have a first through hole 161 formed in one side and a second through hole 162 formed in the other side. The connector 135 of the first lead plate 130 may be connected to the fourth surface 111d that is one surface of the can 111 corresponding to the positive electrode of the bare cell 110 by the first through hole 161. The connector 145 of the second lead plate 140 may be connected to the electrode terminal 112 corresponding to the negative electrode of the bare cell 110 by the second through hole 162.

A tape made of an insulation material or any member having the same property, material, and shape as the tape may be used as the insulation member 160.

The label 170 may surround the sides and the bottom of the bare cell 110 after the bare cell 110 is coupled with the cover 150.

Processes of assembling the battery pack 100 according to an embodiment of the present invention having the above structure will be described.

First, the first lead plate 130 and the second lead plate 140 may be assembled on the protective circuit board 121 of the protective circuit module 120. That is, the board connection unit 131 of the first lead plate 130 may be welded to the positive electrode connection terminal (not shown) of the protective circuit board 121. According to an embodiment of the present invention, a PTC element 180 may be mounted between the first lead plate 130 and the protective circuit board 121. Therefore, a board connection unit 131 of the first lead plate 130 may be connected to one end of the PTC element 180. The other end of the PTC element 180 may be connected to the positive electrode connection terminal of the protective circuit board 121.

The negative electrode connection terminal (not shown) of the protective circuit board 121 may be welded to the board connection unit 141 of the second lead plate 140.

Then, the first and second lead plates 130 and 140 are electrically connected to the bare cell 110.

Before the first and second lead plates 130 and 140 are connected to the bare cell 110, the insulation member 160 may be attached to the external surface of the bare cell 110. The insulation member 160 may be attached to the third, fourth, and fifth surfaces 111c, 111d, and 111e of the can 111, to which the first and second lead plates 130 and 140 may be attached.

The protective circuit module 120, in which the first and second lead plates 130 and 140 are assembled, may be seated on the narrow and relatively long fifth or sixth surface 111e or 111f among the sides of the can 111 of the bare cell 110.

According to an embodiment of the present invention, the protective circuit module 120 may be seated on the fifth surface 111e.

The protective circuit module 120 may be seated such that the first and second lead plates 130 and 140 are electrically connected to mechanically support the protective circuit module 120.

The curvature piece 134 of the bare cell connection unit 132 of the first lead plate 130 may be seated on the fifth surface 111e. The connector 135 may be welded to the fourth surface 111d. Therefore, the first lead plate 130 may be electrically connected to the positive electrode of the bare cell 110 by the connector 135. The first lead plate 130 can mechanically support the protective circuit board 121 by the curvature piece 134. In particular, the curvature piece 134 may have approximately the same curvature as that of the fifth surface 111e and a large width so that the curvature piece 134 may be closely attached to the fifth surface 111e.

The curvature piece 144 of the bare cell connection unit 142 of the second lead plate 140 may be seated on the fifth surface 111e. The connector 145 may be welded to the electrode terminal 112 as a negative electrode terminal that protrudes from the third surface 111c. Therefore, the second lead plate 140 i may be s electrically connected to the negative electrode of the bare cell 110 by the connector 145. The second lead plate 140 can mechanically and stably support the protective circuit board 121 by the curvature piece 144. The curvature piece 144 may have approximately the same curvature as that of the fifth surface 111e and a large width so that the curvature piece 144 may be closely attached to the fifth surface 111e.

As described above, the curvature pieces 134 and 144 of the first and second lead plates 130 and 140 may have the same curvature as that of the fifth surface 111e of the bare cell 110 and may have a relatively large width. Therefore, the curvature pieces 134 and 144 may have a large area and be attached to the fifth surface 111e of the bare cell 110. Therefore, the protective circuit board 121 may be supported by the first and second lead plates 130 and 140 as stably as possible.

Then, the cover 150 can make the protective circuit module 120 surround the bare cell 110. The first frame 151 of the cover 150 can surround parts of the protective circuit module 120 and the first and second lead plates 130 and 140. The external terminals 122 of the protective circuit module 120 can protrude through the terminal holes 151a formed in the first frame 151. The remaining parts of the first and second lead plates 130 and 140 may be surrounded by the second and third frames 152 and 153. The fourth frame 154 may surround the sixth surface 111f of the bare cell 110.

Finally, the bare cell 110 and the cover 150 may be surrounded by the label 170. The cover 150 may be prevented from being separated from the bare cell 110 by the label 170.

The water-sensitive label 190 may be attached to the first frame 151 of the cover 150.

As described above, in a battery pack 100 according to an embodiment of the present invention, the first and second lead plates 130 and 140 may have the same curvature as that of one surface of the bare cell 110 to be attached thereto to support the protective circuit module 120 including the protective circuit board 121. At this time, the first and second lead plates 130 and 140 may electrically connect the bare cell 110 to the protective circuit module 120 and mechanically support the protective circuit module 120. Therefore, a separated support is not required. Although an external shock is applied thereto, the protective circuit module 120 may be stably supported by the first and second lead plates 130 and 140.

Then, the battery pack 100 according to another embodiment of the present invention will be described in accordance with another view point.

Figure 1:
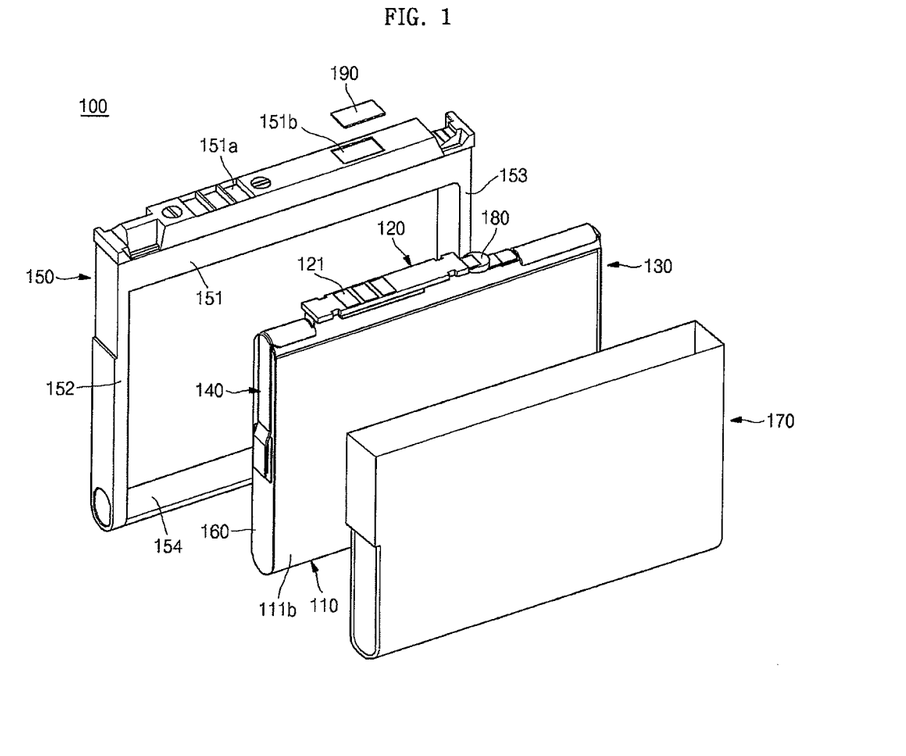
FIG. 1 is an exploded perspective view illustrating a battery pack according to an embodiment of the present invention.
Figure 2:
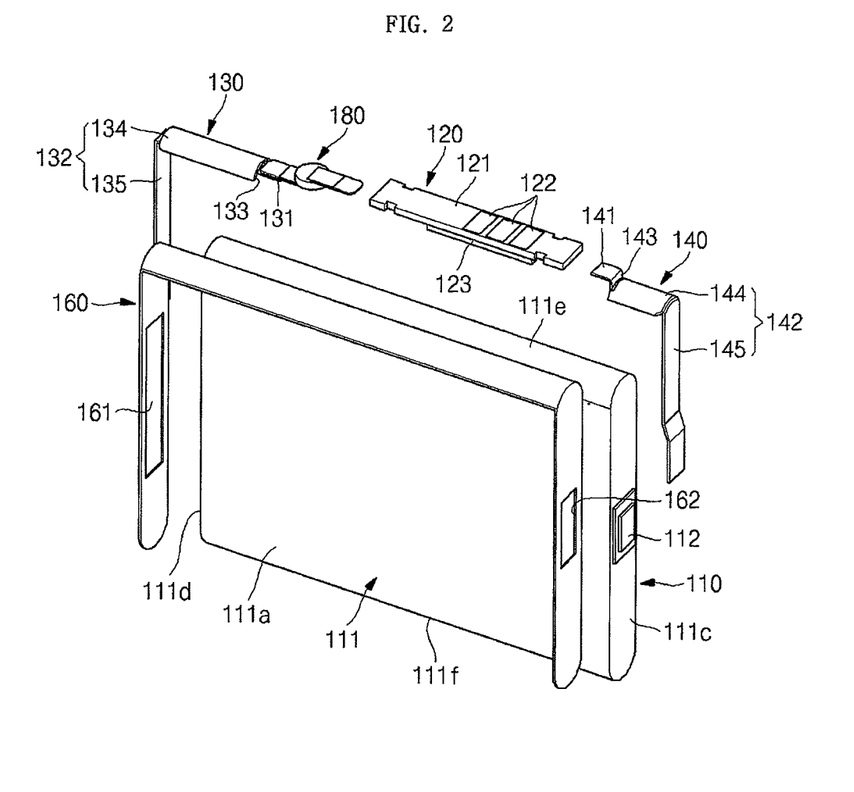
FIG. 2 is an exploded perspective view illustrating a bare cell and a protective circuit board in the battery pack according to the embodiment of the present invention.
Figure 3:
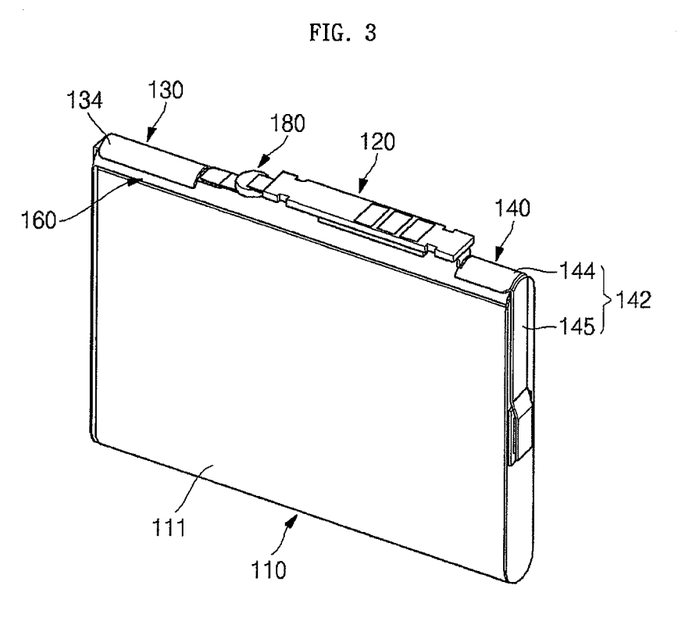
FIG. 3 is a view illustrating the bare cell coupled with the protective circuit board in the battery pack according to the embodiment of the present invention.
Figure 4:
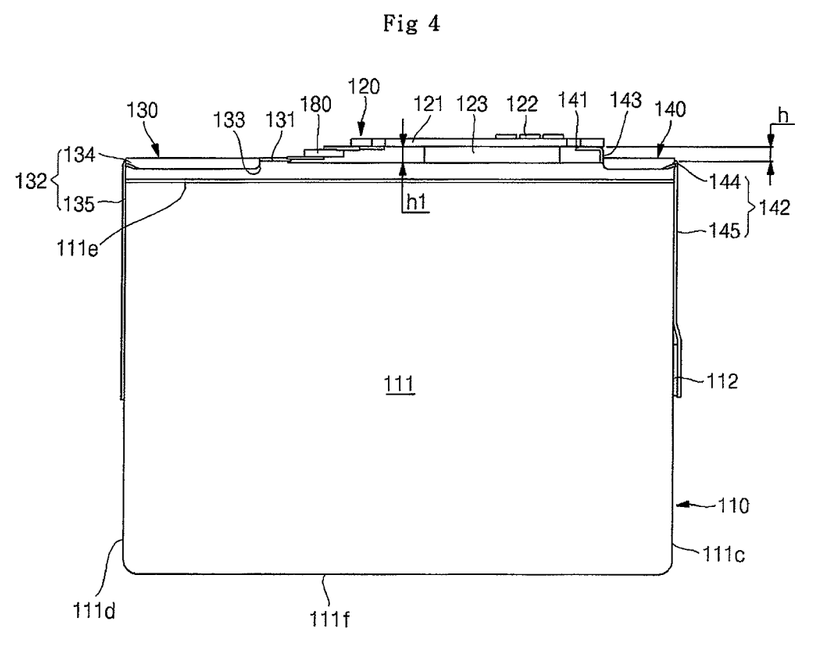
FIG. 4 is a front view of the battery pack of FIG. 3.
Figure 5:
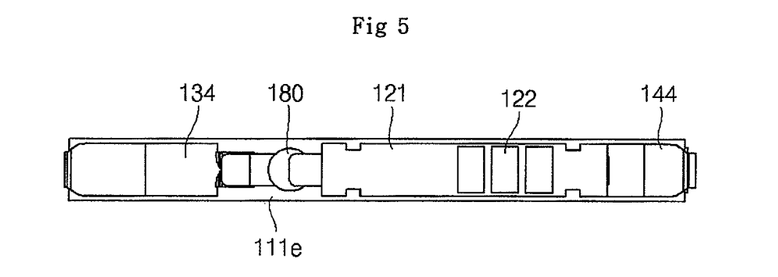
FIG. 5 is a plan view of the battery pack of FIG. 4.
Figure 6:
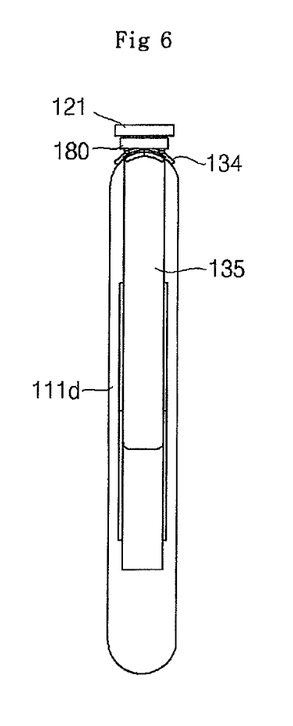
FIG. 6 is a left side sectional view of the battery pack of FIG. 4.
Figure 7:
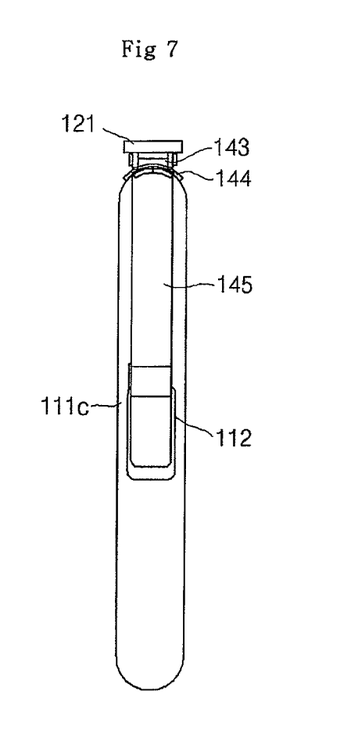
FIG. 7 is a right side sectional view of the battery pack of FIG. 4.

Referring to FIGS. 4 and 5, in the battery pack 100 according to an embodiment of the present invention, the first and second lead plates 130 and 140 support the protective circuit module 120. The first and second lead plates 130 and 140 can include the board connection units 131 and 141, the bare cell connection units 132 and 142, and the connection units 133 and 143 for connecting the board connection units 131 and 141 to the bare cell connection units 132 and 142.

The height h of the connection units 133 and 143 may be equal to the height h1 of the protective circuit element 123 mounted on the protective circuit board 121. The protective circuit element 123 may be mounted in the center of the protective circuit board 121.

In general, the protective circuit element 123 may be mounted on the surface opposite to the surface on which the external terminals 122 of the protective circuit board 121 are mounted. Therefore, the protective circuit element 123 can face one surface of the bare cell 110. When the height h of the connection units 133 and 143 is equal to the height h1 of the protective circuit element 123, the protective circuit element 123 may support the protective circuit module 120 including the protective circuit board 121.

In general, the protective circuit element 123 can have a height of about 1.0 mm. When the length h of the connection units 133 and 143 of the first and second lead plates 130 and 140 is equal to the height h1 of the protective circuit element 123, the first and second lead plates 130 and 140 and the protective circuit element 123 may support the protective circuit board 121 together. Therefore, the protective circuit board 121 may be stably supported by one surface of the bare cell 110.

The protective circuit element 123 may be mounted approximately in the center of one surface of the protective circuit board 121. Therefore, the protective circuit board 121 may be supported by the protective circuit element 123 to prevent from being bent at the center.

The curvature units 134 and 144 of the first and second lead plates 130 and 140 may have an area of at least 20% of the area of the fifth surface 111e. According to an embodiment of the present invention, when the area of the fifth surface 111e is 312.149 mm$^2$, the area of the curvature piece 134 of the first lead plate 130 is 40.744 mm$^2$ and the area of the curvature piece 144 of the second lead plate 140 is 20.7696 mm$^2$. Therefore, the sum of the areas of the curvature pieces 134 and 144 of the first and second lead plates 130 and 140 of the area of the fifth surface 111e is about 19.7%.

When the areas of the curvature pieces of the first and second lead plates are remarkably smaller than 1/5 of the area of the fifth surface, it is difficult to stably support the protective circuit board. When the areas of the curvature pieces of the first and second lead plates are excessively larger than the area of the fifth surface, the fabrication cost of the lead plates increase and the assembly of the lead plates deteriorate.

In the above-described embodiment of the present invention, the first and second lead plates are connected to the bare cell by welding, but the connections are not limited thereto. That is, the first and second lead plates may be connected to the bare cell with an adhesive such as a tape.

As described above, in the battery pack according to an embodiment of the present invention, the center of the protective circuit board may be supported by the protective circuit element to prevent the protective circuit board from being bent. The first and second lead plates may be attached to one surface of the bare cell to support both ends of the protective circuit board.

Therefore, in the battery pack according to an embodiment of the present invention, the protective circuit module including the protective circuit board may be stably supported by the first and second lead plates so that fabrication costs spent in mounting a separated support may be reduced and assembling processes simplified.

What is claimed is:

1. A battery pack comprising:
a bare cell comprising a first surface having a length and a width, a second surface that comprises a positive electrode and a third surface wherein a negative electrode is attached to the third surface and a fourth surface, wherein the second and third surfaces are substantially perpendicular to the first and fourth surfaces and wherein two flat surfaces interconnect the first, second, third and fourth surfaces;
a protective circuit module disposed over the first surface and comprising a positive electrode connection terminal and a negative electrode connection terminal;
a first lead plate disposed over the first surface and coupled to the positive electrode and the positive electrode connection terminal, wherein the first lead plate comprises a protective circuit module connector extending from one end of the first lead plate to couple to the positive electrode connection terminal; and
a second lead plate disposed over the first surface and coupled to the negative electrode and the negative electrode connection terminal, wherein the second lead plate comprises a protective circuit module connector extending from one end of the second lead plate to couple to the negative electrode connection terminal; and
a protective circuit element interposed between the bare cell and the protective circuit module, wherein the protective circuit element has a maximum thickness that is substantially the same as a height of the protective circuit module connectors of the first and second lead plates, such that the protective circuit element supports the protective circuit module including the protective circuit board and wherein only the protective circuit element is interposed between the bare cell and the protective circuit module;
wherein the first surface of the bare cell is curved across the width of the first surface, wherein the first lead plate has a first curvature piece conforming to the first surface, wherein the second lead plate has a second curvature piece conforming to the first surface, and wherein the first curvature piece and the second curvature piece are seated on the first surface, wherein the first curvature piece and second curvature piece extend along the length of the first surface a distance greater than the curved width of the curved surface so as to provide support to the protective circuit module; and
a cover that is positioned over the curved surfaces of the bare cell so as to receive the curved surfaces therein.

2. The battery pack of claim 1, wherein the first surface of the bare cell has a substantially continuous radius of curvature.

3. The battery pack of claim 1, wherein the first surface of the bare cell has a first curved shape and wherein each lead plate define a second conforming curved shaped that defines a recess that is sized so as to receive the first curve shape in the recess defined by the second conforming curved shape.

4. The battery pack of claim 1, wherein the first and second lead plates have a total surface area that is at least about 20% of the surface area of the first surface of the bare cell.

5. The battery pack of claim 1, further comprising a protective circuit element interposed between the bare cell and the protective circuit module to control charging and discharging of the bare cell.

6. The battery pack of claim 5, wherein the protective circuit element is interposed between ends of the protective circuit module to inhibit the protective circuit module from bending.

7. The battery pack of claim 6, wherein the protective circuit element is positioned at a center region of the protective circuit module.

8. The battery pack of claim 1, wherein the first lead plate comprises a bare cell connector extending from another end of the first lead plate to couple to a contact of the positive electrode, and the second lead plate comprises a bare cell connector extending from another end of the second lead plate to couple to a contact of the negative electrode, wherein the bare cell connectors have a shape conforming to the surfaces of the bare cell on which the positive and negative electrode contacts are positioned.

9. The battery pack of claim 8, wherein each lead plate further comprises an interconnecting element between the lead plate and the protective circuit module connector.

10. The battery pack of claim 9, wherein each lead plate and each protective circuit module connector are substantially parallel to each other, and each interconnecting element is substantially perpendicular to the lead plates and the protective circuit module connectors.

11. A battery pack comprising:
a bare cell comprising a first surface having a width and a length that has a curvature across the width and a second, third surfaces that are coupled to the first surface and a fourth surface wherein the second surface comprises a positive electrode and the third surface includes a negative electrode and the second and third surfaces are substantially perpendicular to the first and fourth surfaces and wherein two flat surfaces interconnect the first, second, third and fourth surfaces;
a protective circuit module disposed over the first surface of the bare cell which includes a protective circuit element;
a first and second lead plate disposed over the first surface and coupled to the bare cell and the protective circuit module wherein at least a portion of the first and second lead plates adjacent the first surface are curved with substantially the same curvature as the first surface along the length of the first surface a distance greater than the curved width of the curved surface so as to provide support for the protective circuit module, wherein the first and second lead comprises a first interconnecting portion that interconnects between the curved portion and the protective circuit module and a second interconnecting portion that interconnects between the curved portions and the bare cell, wherein the first surface of the bare cell has a first curved shape and wherein the curved portion of each lead plate defines a recess that is sized so as to receive the first curve shape in the recess defined by the second conforming curved shape, and wherein the first interconnecting portions are substantially parallel to the curved portions and the second interconnecting portions are substantially perpendicular to the curved portions so as to extend along the second and third sides of the bare cell, and wherein the second interconnecting portions each have a width that is smaller than the width of the curved portions of the lead plates and wherein only the protective circuit element is interposed between the bare cell and the protective circuit module; and
a cover that is positioned over the curved surfaces of the bare cell so as to receive the curved surfaces therein.

* * * * *